United States Patent
Zuo et al.

(10) Patent No.: US 9,664,919 B2
(45) Date of Patent: May 30, 2017

(54) 3D DISPLAY DEVICE AND OPERATING METHOD THEREOF

(71) Applicants: BOE Technology Group Co., Ltd., Beijing (CN); Chengdu BOE Optoelectronics Technology Co., Ltd., Chengdu (CN)

(72) Inventors: Xiongcan Zuo, Beijing (CN); Junhwan Lim, Beijing (CN); Junrui Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 106 days.

(21) Appl. No.: 13/979,094

(22) PCT Filed: Nov. 21, 2012

(86) PCT No.: PCT/CN2012/084984
§ 371 (c)(1),
(2) Date: Jul. 10, 2013

(87) PCT Pub. No.: WO2013/143306
PCT Pub. Date: Oct. 3, 2013

(65) Prior Publication Data
US 2014/0078199 A1 Mar. 20, 2014

(30) Foreign Application Priority Data
Mar. 27, 2012 (CN) .......................... 2012 1 0084524

(51) Int. Cl.
G09G 5/00 (2006.01)
H04N 13/04 (2006.01)
(Continued)

(52) U.S. Cl.
CPC ......... *G02B 27/26* (2013.01); *G02B 27/2264* (2013.01); *H04N 13/0434* (2013.01); *H04N 13/0486* (2013.01)

(58) Field of Classification Search
CPC  G02B 27/0101; G02B 7/102; G02B 27/2214; G02B 27/26; G02B 26/001;
(Continued)

(56) References Cited

U.S. PATENT DOCUMENTS 4,229,072 A * 10/1980 Torok et al. .................. 359/282
5,113,285 A   5/1992 Franklin et al.
(Continued)

FOREIGN PATENT DOCUMENTS

CN   101458312 A   6/2009
CN   102116936 A   7/2011
(Continued)

OTHER PUBLICATIONS

First Office Action (Chinese language) for CN patent application 201210084524.4 issued by the State Intellectual Property Office ("SIPO"), Sep. 11, 2013, 6 pages.
(Continued)

*Primary Examiner* — Dawayne A Pinkney (57) ABSTRACT

A 3D display device and an operating method thereof, the 3D display device comprising: a display screen (10), for displaying two-dimensional left and right eye pictures; a magnetic field device (20), disposed right in front of the display screen (10) on a light emitting side of the display screen and generating a magnetic field having a varying frequency in synchronization with a refresh frequency of the two-dimensional left and right eye pictures of the display screen (10), thus rotating a direction of a polarization plane of polarized light emitted from the display screen (10).

11 Claims, 3 Drawing Sheets (51) Int. Cl.
*G02F 1/09* (2006.01)
*G02B 27/22* (2006.01)
*G02B 27/26* (2006.01)

(58) Field of Classification Search
CPC ........... G02B 27/2228; H04N 13/0438; H04N 13/044; H04N 9/3197; H04N 13/049; G02F 1/09; B82Y 20/00
USPC ................ 359/697, 282, 462, 465, 237–238, 359/245–246, 464, 466; 345/7; 348/55, 348/53
See application file for complete search history.

(56) References Cited

U.S. PATENT DOCUMENTS

| | | | |
|---|---|---|---|
| 7,515,213 | B2 | 4/2009 | Aramatsu |
| 2004/0027968 | A1* | 2/2004 | Horimai ........................ 369/103 |
| 2008/0055402 | A1 | 3/2008 | Decusatis et al. |
| 2008/0055546 | A1 | 3/2008 | Decusatis et al. |
| 2009/0310044 | A1 | 12/2009 | Lee |
| 2011/0149018 | A1* | 6/2011 | Kroll et al. ..................... 348/40 |
| 2011/0157338 | A1 | 6/2011 | Chang |
| 2011/0267049 | A1 | 11/2011 | Yuan |
| 2012/0050506 | A1* | 3/2012 | Shintani .......................... 348/56 |
| 2012/0139903 | A1* | 6/2012 | Rush et al. ................... 345/419 |
| 2013/0038837 | A1* | 2/2013 | Freeman ............ G02B 27/2264 353/8 |
| 2014/0078199 | A1 | 3/2014 | Zuo |

FOREIGN PATENT DOCUMENTS

| | | |
|---|---|---|
| CN | 101655608 A | 2/2012 |
| CN | 102662249 A | 9/2012 |
| CN | 101900887 A | 12/2012 |

OTHER PUBLICATIONS

English translation of the First Office Action for CN patent application 201210084524.4, listed above, 4 pages.
Second Office Action (Chinese language) for CN patent application 201210084524.4 issued by the State Intellectual Property Office ("SIPO"), Apr. 14, 2014, 5 pages.
English translation of the Second Office Action for CN patent application 201210084524.4, listed above, 4 pages.
PCT International Search Report ("ISR") issued by the International Searching Authority ("ISA") issued Feb. 28, 2013 regarding PCT/CN2012/084984, 13 pages.
English translation of CN102116936(A), listed above, 12 pages.
English translation of CN102662249(A), listed above, 19 pages.
English translation of CN101458312(A), listed above, 15 pages.
English translation of CN101655608(A), listed above, 27 pages.
English translation of CN101900887(A), listed above, 11 pages.
Third Office Action (Chinese language) for CN patent application 201210084524.4 issued by the State Intellectual Property Office ("SIPO"), Oct. 29, 2014, 5 pages.
English translation of Third Office Action (Chinese language) for CN patent application 201210084524.4 issued by the State Intellectual Property Office ("SIPO"), Oct. 29, 2014, 4 pages.
Fourth Office Action (Chinese language) for CN patent application 201210084524.4 issued by the State Intellectual Property Office ("SIPO"), Apr. 22, 2015, 7 pages.
English translation of Fourth Office Action (Chinese language) for CN patent application 201210084524.4 issued by the State Intellectual Property Office ("SIPO"), Apr. 22, 2015, 6 pages.
PCT International Preliminary Report on Patentability for PCT App. No. PCT/CN2012/084984, dated Oct. 1, 2014, 10 pages.

* cited by examiner

3D DISPLAY DEVICE AND OPERATING METHOD THEREOF

CROSS REFERENCE TO RELATED APPLICATIONS

This application is based on International Application No. PCT/CN2012/084984 filed on PCT/CN2012/084984, which claims priority to Chinese National Application No. 201210084524.4, filed on Mar. 27, 2012, the contents of which are incorporated herein by reference.

BACKGROUND

Embodiments of the present invention relate to a 3D display device and an operating method thereof.

Recently, stereoscopic display has become a major trend in the display field, and a 3D display device has become more and more widely used in peoples lives.

Figure 1:
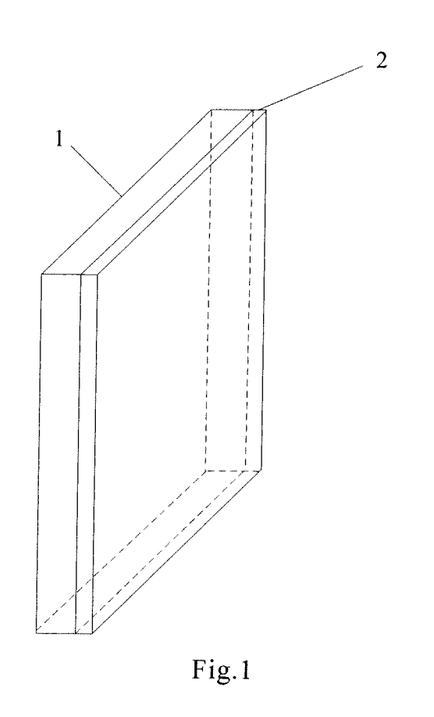
FIG. 1 is a configuration diagram showing a passive polarized 3D display device in the prior art.

FIG. 1 is a schematic diagram of a current 3D display device. As shown in FIG. 1, a popular passive polarized 3D display device is mainly composed of a display screen 1 for outputting and displaying images and a light decomposing device 2 disposed on a light emitting side of the display screen 1, wherein the light decomposing device 2 is used for decomposing a image outputted from the display screen 1 into two different sets of pictures for a viewer's left and right eyes by means of the phase difference thereof, and the two different sets of pictures are: one set of pictures having a polarized direction in parallel with a direction of the polarized plane of incident linear polarized light and the other set of pictures having a polarized direction perpendicular to the direction of the polarized plane of the incident linear polarized light. Alternatively, the light decomposing device 2 decomposes the image outputted from the display screen 1 into a left-handed circular polarized light for the left/right eye and a right-handed circular polarized light for the right/left eye.

After the incident linear polarized light emitted from the display screen 1 passes through the light decomposing device 2, the image is decomposed into two sets of pictures: one set in parallel with and the other set perpendicular to the direction of the polarized plane of the incident linear polarized light. Emitting linear polarized light for the set of pictures in parallel with the direction of the polarized plane of the incident linear polarized light is transmitted through only a right/left eyeglass and is seen by a viewer's right/left eye, and emitting linear polarized light for the other set of pictures perpendicular to the direction of the polarized plane of the incident linear polarized light is transmitted through only a left/right eyeglass and is seen by a viewer's left/right eye, and thus, different pictures seen by the left and right eyes are synthesized into a stereoscopic image by the viewer's brain, a 3D display effect is presented.

However, this display technology reduces the resolution of a display by half, because one original image is decomposed into two sets of pictures respectively seen by the left and right eyes.

SUMMARY

An embodiment of the present invention provides a 3D display device, capable of solving the problem of halving resolution of a current passive 3D display picture.

An embodiment of the invention provides a 3D display device, comprising: a display screen, for displaying two-dimensional left and right eye pictures; a magnetic field device, disposed right in front of the display screen on a light emitting side of the display screen and generating a magnetic field having a varying frequency in synchronization with a refresh frequency of the two-dimensional left and right eye pictures of the display screen, thus rotating a direction of a polarization plane of polarized light emitted from the display screen.

Alternatively, the 3D display device further comprises a signal module, connected with the magnetic field device and providing a varying current signal for the magnetic field device such that the magnetic field device produces a varying magnetic field in accordance with the varying current signal.

Alternatively, the magnetic field generated by the magnetic field device rotates a direction of a polarization plane of linear polarized light emitted from the display screen such that the direction of the polarization plane of the linear polarized light after rotation is back and forth switched between the directions in parallel with and perpendicular to the direction of the polarization plane of the linear polarized light before rotation.

An embodiment of the invention further provides an operating method for the above 3D display device, comprising: providing a varying current signal for the magnetic field device; the magnetic field device producing a varying magnetic field in accordance with the varying current signal, the magnetic field having a varying frequency in synchronization with a refresh frequency of the left and right eye pictures of the display screen; the magnetic field rotating a direction of a polarization plane of linear polarized light emitted from the display screen such that the direction of the polarization plane of the linear polarized light after rotation is back and forth switched between the directions in parallel with and perpendicular to the direction of the polarization plane of the linear polarized light before rotation.

In the 3D display device and the operating method thereof provided by the embodiments of the present invention, by adding the magnetic field device capable of generating a varying magnetic field in front of the display screen and increasing the picture refresh frequency, at different moments, when a signal module provides a varying current signal for the magnetic field device, the magnetic filed device produces a corresponding varying magnetic field, and according to the principle of the Faraday magneto-optical rotation, at different moments, the direction of the polarized plane of the linear polarized light after subjecting to the corresponding Faraday rotation is quickly switched between the directions in parallel with and perpendicular to the direction of the polarization plane of the incident linear polarized light before rotation back and forth, so that the left/right eye can seen a corresponding set of left/right-eye pictures at a particular moment, while the right/left eye can seen another corresponding set of right/left-eye pictures at another particular moment, and then, the pictures respectively seen by the left and right eyes are synthesized by the brain to form a stereoscopic image, thus presenting 3D display effect. By using this new type of 3D display device, pictures can be viewed at full resolution without the issue of reducing the resolution by half.

BRIEF DESCRIPTION OF THE DRAWINGS

In order to clearly illustrate the technical solution of the prior art and the embodiments of the invention, the drawings of the embodiments or the drawings required in describing the prior art will be briefly described in the following; it is obvious that the described drawings are only related to some embodiments of the invention. Those skilled in the art can obtain other drawings according to these drawings without creative effort.

DETAILED DESCRIPTION

In order to make objects, a technical solution and advantages of embodiments of the present application more apparent, the technical solutions of the embodiments will be described in a clearly and fully understandable way in connection with the drawings related to the embodiments of the present application. It is obvious that the described embodiments are just a part but not all of the embodiments of the invention. Based on the described embodiments herein, those skilled in the art can obtain other embodiment(s), without any inventive work, which should be within the scope of the invention.

Figure 2:
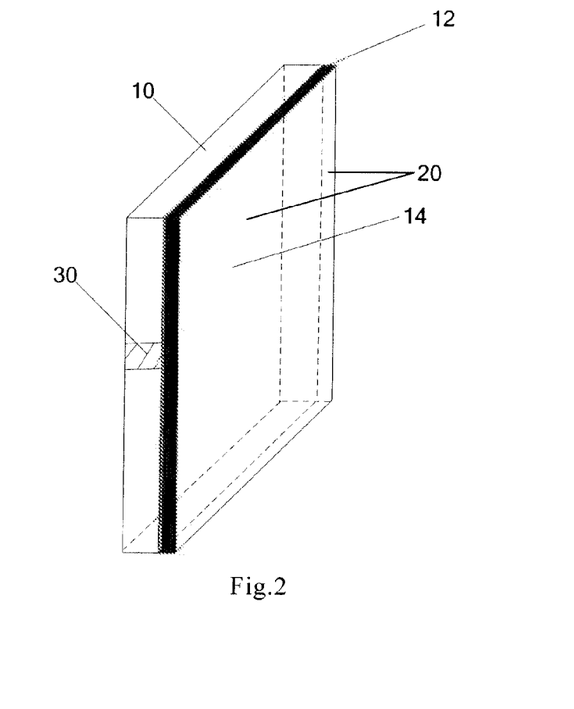
FIG. 2 is a configuration diagram showing the 3D display device provided by an embodiment of the present invention.

FIG. 2 is a schematic diagram showing a configuration of a three dimensional (3D) display device provided by an embodiment of the present invention.

As shown in FIG. 2, the embodiment of the present invention provides a 3D display device, comprising a display screen 10, a magnetic field device 20 and a signal module 30. In the 3D display device, the magnetic field device 20 is disposed directly in front of a light emitting surface of the display screen 10; the magnetic field device 20 is connected with the signal module 30; and the signal module 30 provides the magnetic field device 20 with a varying current signal, so that the magnetic field device 20 generates a varying magnetic field corresponding to the varying current signal with a frequency in synchronization with the left and right eye picture refresh frequency of the display screen 10. The magnetic field rotates a direction of the polarization plane of the linear polarized light emitted from the display screen 10 such that the direction of the polarization plane of the linear polarized light after rotation is switched between the directions in parallel with and perpendicular to the direction of the polarized plane of the linear polarized light before rotation.

More specifically, the magnetic field device 20 is a device capable of generating a varying magnetic field when the signal module 30 provides a varying current signal. For example, the magnetic field device 20 may comprises a coil 12 and a transparent medium 14 located directly in front of the light emitting surface of the display screen 10. The transparent medium 14 and the display screen 10 are arranged with an interval therebetween or without an interval therebetween. In the embodiment of the invention, the transparent medium 14 is disposed with no interval from the display screen 10. The transparent medium 14 having an area greater than or equal to that of an effective display region of the display screen 10 completely covers the effective display region of the display screen 10. The coil 12 is arranged to surround thin sides of the transparent medium 14 (referring to sides along the light emitting direction of the display screen), for example, the coil 12 is arranged on an external peripheral frame of the display screen 10 to act as an external frame of the display screen 10, and is used for producing a varying magnetic field upon receiving the varying current signal provided by the signal module 30. For example, the coil 12 may be a solenoid. One end of the signal module 30 is connected to the coil 12 so as to provide a varying current signal for the coil 12. Optically, the other end of the signal module 30 is connected to the display screen 10 so as to sense the picture change in display screen 10. Optically, the current signal is a non-uniformly varying current signal, the magnetic field induced by which has a varying frequency in synchronization with the picture refresh frequency of the display screen 10.

During the operation of the 3D display device, the display screen 10 outputs and displays a image, the signal module 30 provides the coil 12 with a non-uniformly varying current signal, so that the energized coil 12 generates a varying magnetic field in accordance with the non-uniformly varying current signal. According to the law of electromagnetic induction, the non-uniformly varying current signal makes the energized coil 12 generate the varying magnetic field corresponding to the non-uniformly varying current signal. Alternatively, the non-uniformly varying current signal is a pulse current signal. Moreover, any other non-uniformly varying current signal capable of providing the corresponding magnetic field required can also be adopted. The specific form of the non-uniformly varying current signal in the embodiment of the present invention is not limited, and rather, it can be selected as required.

The varying magnetic field deflects a polarized light according to the Faraday magneto-optical rotation effect. The Faraday magneto-optical rotation effect refers to the rotating phenomenon of the polarization plane of the polarized light due to a magnetic field when the polarized light transmits through a medium. The rotation angle can be expressed as $\theta(\omega)=V(\omega)BL$, wherein $\omega$ is the frequency of the polarized light; B is the magnetic field intensity; L is the propagation length of the polarized light in the medium, i.e., the thickness of the medium; and $V(\omega)$ is the Verdet constant of the medium.

The Faraday magneto-optical rotation effect can occur in both magnetic medium and non-magnetic medium. However, the rotation angle of the polarization plane of polarized light in a magnetic medium is much larger than that in a non-magnetic medium. Those skilled in the art can specifically select a magnetic medium or a non-magnetic medium according to the required Faraday rotation angle, which is not limited in the embodiments of the present invention. According to the formula $\theta(\omega)=V(\omega)BL$, the rotation angle is related with the Verdet constant $V(\omega)$, the magnetic field intensity B and the thickness L of the transparent medium. Considering the magnetic field intensity B and the thickness L of the transparent medium, the transparent medium with a relatively large Verdet constant is selected. In the embodiment of the present invention, in order to obtain a relatively large rotation angle, the Verdet constant of the magnetic medium or non-magnetic medium may have an absolute value greater than 0.33 min/Oe·cm. In this case, the magnetic field intensity B and the medium thickness L may decrease correspondingly. Then, according to the law of electromagnetic induction, a relatively small current signal and the thin transparent medium can be used to rotate the polarization plane of the polarized light.

By using a transparent medium with a relatively large Verdet constant, a relatively small current signal and a relatively thin transparent medium can be selected, so as to achieve the effect of energy saving and reducing weight of the 3D display device.

Alternatively, the transparent medium provided by the embodiment of the present invention may be a transparent magnetic medium, such as, a transparent magneto-optical glass, a transparent diluted magnetic semiconductor thin film or a transparent magneto-optical thin film, and together with the magnetic field generated by the coil 12, better rotates the direction of the polarization plane of the light transmitting therethrough.

The magneto-optical glass having a good uniformity in each direction is capable of further improving the display effect of the 3D glasses. The transparent diluted magnetic semiconductor thin film and the transparent magneto-optical thin film have the excellent magneto-optical performance and are formed by the thin film, and thus, the weight of the 3D display device can be further reduced.

According to the electromagnetic theory, the energized coil can produce a magnetic field thereinside, which is capable of collectively rotating the polarization plane of the polarized light passing through the coil by a desired angle. The coil is formed by multi-winding fine conductive wire, and thus, has a certain mechanical strength and can act as the external frame of the display screen at an outside peripheral of the display screen 10. In this case, the 3D display device has a better 3D effect and a more simple structure, since no further additional display screen external frame is needed.

After the signal module 30 provides a non-uniformly varying current signal for the coil 12 and the energized coil 12 produces a varying magnetic field corresponding to the non-uniformly varying current signal, according to the Faraday magneto-optical rotation effect, the varying magnetic field deflects the direction of the polarization plane of the linear polarized light from the display screen 10, so that the linear polarized light from the display screen 10 has its polarization plane rotated when transmitting through the transparent medium 14 and the energized coil 12. In the embodiment of the present invention, the direction of the polarization plane after rotation is parallel with or perpendicular to the direction of the polarization plane before rotation. Moreover, upon refreshing of the display screen 10, the current is controlled by the signal module 30 so that the polarization plane of the linear polarized light after passing through the transparent medium 14 and the energized coil 12 is changed correspondingly, that is, the direction of the polarization plane of the rotated linear polarized light is switched between the directions in parallel with and perpendicular to the direction of the polarization plane of the unrotated linear polarized light back and forth.

It should be understand that the magnetic field induced by the non-uniformly varying current signal provided to the coil 12 by the signal module 30 has a varying frequency in synchronization with the picture refresh frequency the 3D display screen, so that 3D images can be observed synchronously. As the varying frequency of the magnetic field induced by the non-uniformly varying current signal provided to the coil 12 by the signal module 30 is kept in synchronization with the picture refresh frequency of the 3D display screen 10, the direction of the polarization plane of the linear polarized light rotated by the magnetic field device 20 changes with the picture of the display screen 10. The synchronization control technology for the signal module 30 can be found in prior art, and the details thereof are omitted herein.

Furthermore, in order to avoid 3D display screen flicker visible by viewer's eyes, the refresh frequency F of the display screen 10 is more than 120 Hz. For example, a current pulse signal with a frequency of F/4 is inputted into the energized coil 12 and by means of the signal module 30, the varying frequency of the magnetic field induced by the current pulse signal is made to precisely be synchronized with the refresh frequency of the display screen 10.

In the existing 3D glasses, one of the left eyeglass and the right eyeglass transmits the light having the direction of the polarization plane in parallel with the polarization plane of the linear polarized light before entering the transparent medium 14 and the energized coil 12, while the other transmits the light having the direction of the polarization plane perpendicular to the polarization plane of the linear polarized light before entering the transparent medium 14 and the energized coil 12.

In the embodiment of the present invention, the direction of the polarization plane of the outgoing linear polarized light emitted from the display screen 10 and rotated by the magnetic field device 20 is back and forth switched between the directions in parallel with and perpendicular to the direction of the polarization plane of the linear polarized light before the rotation at different moments, and the outgoing linear polarized light respectively enters into a viewer's left and right eyes after passing through the left and right eyeglasses of the 3D glasses. A corresponding set of left-eye pictures seen by the left eye at a particular moment and another corresponding set of right-eye pictures seen by the right eye at another particular moment are synthesized by the brain to form a stereoscopic image. Therefore, a set of full resolution pictures can be viewed.

Compared to the prior art, though the 3D display device provided by the embodiment of the present invention still utilizes the 3D glasses having the polarized eyeglasses capable of respectively transmitting the linear polarized lights with different polarized directions (the orthogonal linear polarized lights), by adding the magnetic field device 20 capable of generating a varying magnetic field in front of the display screen 10 and increasing the picture refresh frequency, at different moments, the direction of the polarized plane of the linear polarized light after subjecting to the corresponding Faraday rotation is quickly switched between the directions in parallel with and perpendicular to the direction of the polarization plane of the incident linear polarized light before rotation back and forth, so that the left eye can seen a corresponding set of left-eye pictures at a particular moment, while the right eye can seen another corresponding set of right-eye pictures at another particular moment, and then, the pictures respectively seen by the left and right eyes are synthesized by the brain to form a stereoscopic image, thus presenting 3D display effect. By using this new type of 3D display device, pictures can be viewed at full resolution without the issue of reducing the resolution by half.

In an alternatively embodiment, the 3D display device further comprises a $\lambda/4$ wave plate right in front of the magnetic field device on the light emitting side thereof. After transmitting through the magnetic field device, the linear polarized lights are rotated by the magnetic field device to have the polarized direction orthogonal to each other, and the orthogonal linear polarized lights pass through the $\lambda/4$ wave plate and then become a left/right-handed circular polarized light and a right/left-handed circular polarized light, so as to respectively correspond to a left/right picture and a right/left picture. In this way, the left eye can see a corresponding set of left-eye pictures at a particular moment, while the right eye can see another corresponding set of right-eye pictures at another particular moment. Then, the pictures received by the left and right eyes are synthesized by the brain to form a stereoscopic image, thus presenting 3D display effect. By using this new type of 3D display device, pictures can be viewed at full resolution without halving the resolution.

In order to better understand the embodiment of the present invention, examples are given below for further illustration.

Figure 3:
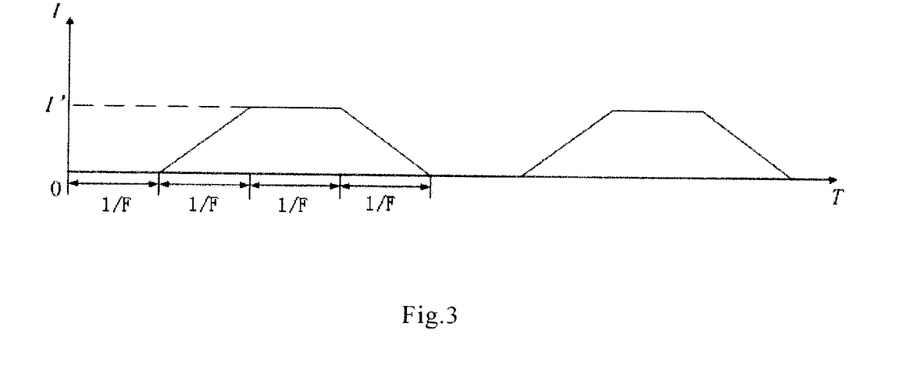
FIG. 3 is a schematic diagram showing an example of the pulse current signal provided by the signal module in FIG. 2.

FIG. 3 is a schematic diagram showing an example of the pulse current signal provided by the signal module in FIG. 2. In the example shown in FIG. 3, the period of the pulse current signal is F/4, the frequency of the current pulse signal inputted into the energized coil 12 is F/4. It should be understood that the pulse current signal is described herein as an example, and other non-uniformly varying current signal can also be applied to the present invention.

Figure 4:
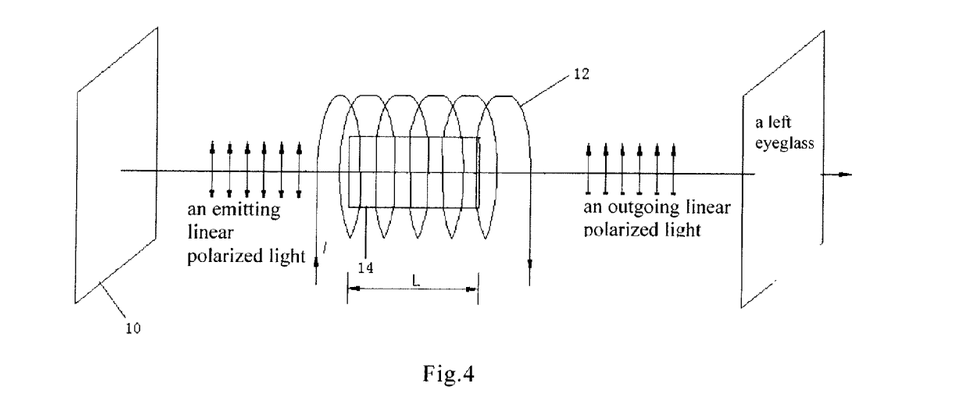
FIG. 4 is a principle schematic diagram showing the 3D display device provided by the embodiment of the present invention in the first 1/F frame rate time of FIG. 3.

Referring to FIG. 3, in the first 1/F frame period, the display screen 10 only outputs a picture to be seen by the left eye. In the meantime, the current inputted into the energized coil 12 by the signal module 30 becomes zero. Here, no induction magnetic field is generated. According to the Faraday magnetic-optical rotation formula $\theta(\omega)=V(\omega)BL$, $\theta(\omega)$ is proportional to B when $V(\omega)$ and L is constant. In this case, the polarization plane of the incident linear polarized light is not subjected to the Faraday rotation. As shown in FIG. 4, the direction of the polarization plane of the light also is not changed correspondingly. At this moment, the linear polarized light transmits through only a left eyeglass having a polarized direction in parallel with the polarization plane thereof. Therefore, in the first 1/F frame period, only the left eye sees the picture displayed on the display screen.

Figure 5:
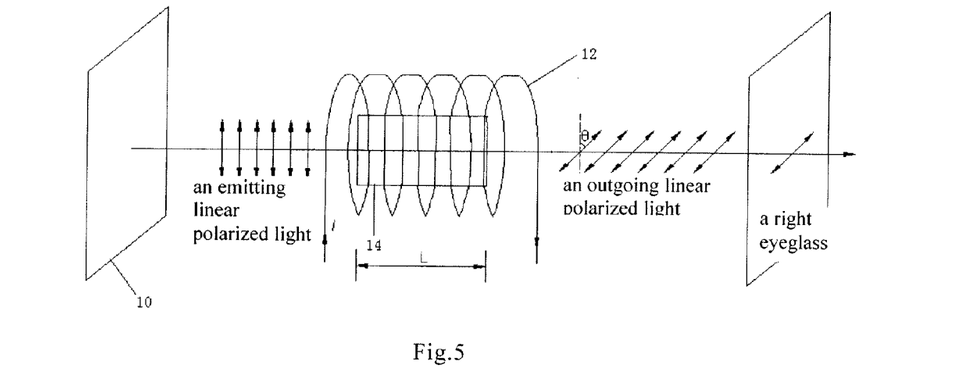
FIG. 5 is a principle schematic diagram showing the 3D display device provided by the embodiment of the present invention in the second 1/F frame rate time of FIG. 3.

In the second 1/F frame period, the display screen 10 only outputs a picture to be seen by the right eye. In the meantime, the current inputted into the energized coil 12 by the signal module 30 is changed from 0 to I'. The change of the current from 0 to I' can induce a magnetic field B' rotating the polarization plane of the incident linear polarized light by 90°. As shown in FIG. 5, the direction of the polarization plane of the light is correspondingly deflected by 90°. At this moment, the linear polarized light only transmits through a right eyeglass having the polarized direction in parallel with the polarization plane thereof. Therefore, in the second 1/F frame period, only the right eye sees the picture displayed on the display screen.

In the third 1/F frame period, the display screen 10 again only outputs a picture to be seen by the left eye. In the meantime, the current inputted into the energized coil 12 by the signal module 30 is I'. At this moment, the current is changed from I' to I' with $\Delta I=0$. Based on the electromagnetic induction formula $E=L\Delta I/\Delta t=n\Delta\Phi/\Delta t$, the Faraday rotation does not occur since no magnetic flux generates inside the energized coil 12. That is, as shown in FIG. 4, the direction of the polarization plane of the light does not change correspondingly. At this moment, the linear polarized light only transmits through the left eyeglass having the polarized direction in parallel with the polarization plane thereof. Therefore, in the third 1/F frame period, only the left eye sees the picture for the left eye displayed on the display screen.

In the fourth 1/F frame period, the display screen 10 again only outputs a picture to be seen by the right eye. In the meantime, the current inputted into the energized coil 12 by the signal module 30 is changed from I' to 0. The change of the current from I' to 0 can induce a magnetic field B' rotating the polarization plane of the incident linear polarized light by 90°. That is, as shown in FIG. 5, the direction of the polarization plane of the light is correspondingly deflected by 90°. At this moment, the linear polarized light only transmits through the right eyeglass having the polarized direction in parallel with the polarization plane thereof. Therefore, in the fourth 1/F frame period, only the right eye sees the picture for the right eye displayed on the display screen.

According to the above principle, four 1/F frame periods constitute one cycle of the current pulse signal. In this way, the right and left eyeglasses can achieve picture switching in synchronization with the display screen, thus achieving a 3D display effect.

It should be noted that the terms "left eye" and "right eye" are described by way of example, which can be correspondingly exchanged in the embodiment of the present invention. For example, in the first 1/F frame period, the display screen 10 may firstly output a picture to be seen by a right eye. Then, in the second 1/F frame period, the display screen 10 outputs a picture to be seen by a left eye. During the following 1/F frame periods, the display screen 10 outputs pictures alternately in this order.

For example, the display screen 10 may also be a LCD display screen, an OLED (Organic Light-Emitting Diode) display screen, a plasma display screen, an electronic ink display screen, etc., which is not limited in an embodiment of the present invention.

If the LCD display screen is taken as an example, the display screen comprises: a color filter substrate; an array substrate, opposed to the color filter substrate so as to form a liquid crystal cell; liquid crystal material, filled into the liquid crystal cell; and a frame. The array substrate in the embodiment of the present invention comprises a plurality of gate lines and a plurality of data lines, wherein the gate lines and data lines cross each other to thereby define pixel units arranged in a matrix. Each pixel unit includes a pixel electrode and a thin-film transistor as a switching element. The pixel electrode of each pixel unit of the array substrate is used for applying an electric field to control the rotation degree of the liquid crystal material, thereby performing a display operation. In some examples, the LCD display screen further includes a backlight source providing a backlight for the array substrate.

If the display screen is an OLED display screen, it comprises an OLED unit and a thin film transistor. The OLED unit comprises an anode conductor, a cathode conductor, and an organic material coating layer provided between the anode conductor and the cathode conductor. Preferably, the anode conductor is ITO.

Furthermore, an embodiment of the invention provides an operating method of the 3D display device according to any previous embodiment of the present invention, comprising:

101, the signal module providing a varying current signal for the magnetic field device;

102, the magnetic field device generating a varying magnetic field corresponding to the varying current signal, the varying frequency of the magnetic field being in synchronization with the refresh frequency for the left and right eye pictures of the display screen;

103, the magnetic field rotating the direction of the polarization plane of the linear polarized light emitted from the display screen, such that the direction of the polarization plane of the rotated linear polarized light is back and forth switched between the directions in parallel with and perpendicular to the direction of the polarization plane of the linear polarized light before rotation.

As compared to the prior art, though the 3D display device provided by the embodiment of the present invention still utilizes the 3D glasses having the polarized eyeglasses capable of respectively transmitting the linear polarized lights with different polarized directions (the orthogonal linear polarized lights), by adding the magnetic field device 20 capable of generating a varying magnetic field in front of the display screen 10 and increasing the picture refresh frequency, at different moments, the direction of the polarized plane of the linear polarized light after subjecting to the corresponding Faraday rotation is quickly switched between the directions in parallel with and perpendicular to the direction of the polarization plane of the incident linear polarized light before rotation back and forth, so that the left eye can seen a corresponding set of left-eye pictures at a particular moment, while the right eye can seen another corresponding set of right-eye pictures at another particular moment, and then, the pictures respectively seen by the left and right eyes are synthesized by the brain to form a stereoscopic image, thus presenting 3D display effect. By using this new type of 3D display device, pictures can be viewed at full resolution without the issue of reducing the resolution by half.

It should be understood by those skilled in the art that various changes and modifications may be made in these embodiments without departing from the scope and spirit of the present invention. If these changes and modifications fall into the range of the claims and their equivalents, the present invention also is directed to include these changes and modifications.

What is claimed is:

1. A 3D display device, comprising:
   a display screen, for displaying two-dimensional left and right eye pictures;
   a magnetic field device, disposed right in front of the display screen on a light emitting side of the display screen and generating a magnetic field having a varying frequency in synchronization with a refresh frequency of the two-dimensional left and right eye pictures of the display screen, thus rotating a direction of a polarization plane of polarized light emitted from the display screen,
   a signal module, connected with the magnetic field device and providing a varying current signal for the magnetic field device such that the magnetic field device produces a varying magnetic field in accordance with the varying current signal,
   wherein the direction of the polarization plane of the linear polarized light rotated by the magnetic field device changes with refreshment of the picture of the display screen and is back and forth switched between a direction in parallel with and perpendicular to a direction of the polarization plane of the linear polarized light before rotation;
   wherein the current signal is a pulse current signal.

2. The 3D display device according to claim 1, wherein the magnetic field generated by the magnetic field device rotates a direction of a polarization plane of linear polarized light emitted from the display screen such that the direction of the polarization plane of the linear polarized light for the left eye picture after rotation and the direction of the polarization plane of the linear polarized light for the right eye picture after rotation are orthogonal to each other.

3. The 3D display device according to claim 1, wherein the magnetic field device comprises a coil and a transparent medium, the transparent medium completely covering an effective display region of the display screen, the coil disposed to surround thin sides of the transparent medium.

4. The 3D display device according to claim 3, wherein the coil is disposed on an outside peripheral frame of the display screen to act as an external frame of the display screen.

5. The 3D display device according to claim 3, wherein the transparent medium is a transparent magnetic medium or a transparent non-magnetic medium.

6. The 3D display device according to claim 5, wherein the Verdet constant of the transparent magnetic medium or the transparent non-magnetic medium has an absolute value greater than 0.33 min/Oe·cm.

7. The 3D display device according to claim 5, wherein the transparent magnetic medium is a transparent magneto-optical glass, a transparent diluted magnetic semiconductor thin film or a transparent magneto-optical thin film.

8. The 3D display device according to claim 3, wherein the transparent medium is disposed without an interval from an outside surface on a light emitting side of the display screen.

9. The 3D display device according to claim 1, wherein the 3D display device further comprises a λ/4 wave plate disposed right in front of the magnetic field device on a light emitting side of the magnetic field device.

10. The 3D display device according to claim 9, wherein the magnetic field generated by the magnetic field device rotates a direction of a polarization plane of linear polarized light emitted from the display screen such that the direction of the polarization plane of the linear polarized light for the left eye picture after rotation and the direction of the polarization plane of the linear polarized light for the right eye picture after rotation are orthogonal to each other, and the rotated linear polarized light for the left eye picture and the rotated linear polarized light for the right eye picture become left-handed and right-handed circular polarized light after passing through the λ/4 wave plate.

11. An operating method for a 3D display device,
   the 3D display device, comprising:
   a display screen, for displaying two-dimensional left and right eye pictures;
   a magnetic field device, disposed right in front of the display screen on a light emitting side of the display screen and generating a magnetic field having a varying frequency in synchronization with a refresh frequency of the two-dimensional left and right eye pictures of the display screen, thus rotating a direction of a polarization plane of polarized light emitted from the display screen;
   a signal module, connected with the magnetic field device and providing a varying current signal for the magnetic field device such that the magnetic field device produces a varying magnetic field in accordance with the varying current signal;
   the operating method for the 3D display device, comprising:
   providing a varying current signal by the signal module for the magnetic field device;
   the magnetic field device producing a varying magnetic field in accordance with the varying current signal, the magnetic field having a varying frequency in synchronization with a refresh frequency of the left and right eye pictures of the display screen;
   the magnetic field rotating a direction of a polarization plane of linear polarized light emitted from the display screen such that the direction of the polarization plane of the linear polarized light after rotation is back and forth switched between the directions in parallel with and perpendicular to the direction of the polarization plane of the linear polarized light before rotation,
wherein the direction of the polarization plane of the linear polarized light after rotation rotated by the magnetic field device changes with refreshment of the picture of the display screen and is back and forth switched between a direction in parallel with and perpendicular to a direction of the polarization plane of the linear polarized light before rotation;
wherein the current signal is a pulse current signal.

* * * * *